US012798788B2

(12) United States Patent
Moy et al.

(10) Patent No.: US 12,798,788 B2
(45) Date of Patent: *Nov. 17, 2026

(54) TRANSITION GAUGE FOR ELECTRIC AIRCRAFT

(71) Applicant: BETA AIR LLC, South Burlington, VT (US)

(72) Inventors: Nicholas Moy, South Burlington, VT (US); Collin Freiheit, Burlington, VT (US); Lochie Ferrier, Burlington, VT (US); Pranav Krishnamurthy, South Burlington, VT (US); Richard Donnelly, South Burlington, VT (US)

(73) Assignee: BETA AIR LLC, South Burlington, VT (US)

( * ) Notice: Subject to any disclaimer, the term of this patent is extended or adjusted under 35 U.S.C. 154(b) by 5 days.

This patent is subject to a terminal disclaimer.

(21) Appl. No.: 19/037,892

(22) Filed: Jan. 27, 2025

(65) Prior Publication Data

US 2025/0187751 A1 Jun. 12, 2025

Related U.S. Application Data

(63) Continuation of application No. 17/852,299, filed on Jun. 28, 2022, now Pat. No. 12,208,917.

(51) Int. Cl.
*B64D 45/00* (2006.01)
*B64C 29/00* (2006.01)
(Continued)

(52) U.S. Cl.
CPC ...... *B64D 45/0005* (2013.01); *B64C 29/0033* (2013.01); *B64D 27/34* (2024.01); *B64D 31/16* (2024.01)

(58) Field of Classification Search
None
See application file for complete search history.

(56) References Cited

U.S. PATENT DOCUMENTS 6,195,598 B1 2/2001 Bosqui
7,031,812 B1 4/2006 Pettigrew
(Continued)

FOREIGN PATENT DOCUMENTS

WO WO 9742466 11/1997

OTHER PUBLICATIONS

Wikipedia, Airspeed Indicator, Oct. 2, 2021.
(Continued)

*Primary Examiner* — Hitesh Patel
*Assistant Examiner* — Wenyuan Yang
(74) *Attorney, Agent, or Firm* — Lee & Hayes, P.C.

(57) ABSTRACT

In an aspect, a propulsor gauge is provided that provides guidance during a transition of a mode of operation of an electronic aircraft. Propulsor gauge may include a processor configured to identify a current thrust envelope parameter of one or more propulsors of electric aircraft. Processor may also determine a recommended range as a function of the propulsor parameter, where the recommended range includes a lower threshold and an upper threshold. The recommended range and thrust envelope parameter may then be shown on a display of propulsor gauge, where a measurement of current thrust envelope parameter relative to recommended range may be represented by an indicator.

20 Claims, 6 Drawing Sheets

(51) Int. Cl.
*B64D 27/34* (2024.01)
*B64D 31/16* (2024.01)

(56) References Cited

U.S. PATENT DOCUMENTS

| | | | |
|---|---|---|---|
| 7,322,178 B2 | 1/2008 | Simoni | |
| 7,414,544 B2 | 8/2008 | Oltheten | |
| 7,471,996 B2 | 12/2008 | Bartel | |
| 7,636,054 B2 | 12/2009 | Cottet | |
| 7,706,932 B2 | 4/2010 | Morales De La Rica et al. | |
| 8,090,483 B2 | 1/2012 | Pepitone et al. | |
| 8,527,119 B2 | 9/2013 | Chaptal et al. | |
| 8,670,881 B2 | 3/2014 | DeJonge | |
| 8,918,235 B1 | 12/2014 | Eggold et al. | |
| 9,272,778 B2 | 3/2016 | Eglin | |
| 9,409,655 B1 | 8/2016 | Vallart | |
| 9,536,358 B2 | 1/2017 | Germanetti | |
| 9,663,243 B2 | 5/2017 | Mccollough | |
| 10,037,706 B1 | 7/2018 | Cutler et al. | |
| 10,173,787 B1 | 1/2019 | Oltheten | |
| 10,329,028 B2 | 6/2019 | Abbas | |
| 10,457,417 B2 | 10/2019 | Oltheten | |
| 10,479,484 B2 | 11/2019 | Huynh et al. | |
| 10,761,674 B2 | 9/2020 | Ramachandra | |
| 10,890,928 B2 | 1/2021 | Soma et al. | |
| 10,895,948 B2 | 1/2021 | Lepage | |
| 11,249,493 B2 | 2/2022 | Murata et al. | |
| 11,373,543 B1 | 6/2022 | Moeykens | |
| 11,377,201 B1 | 7/2022 | Auerbach | |
| 11,417,225 B1 | 8/2022 | Moeykens | |
| 11,427,305 B1 | 8/2022 | Wiegman | |
| 11,435,761 B1 | 9/2022 | Wiegman | |
| 11,435,762 B1 | 9/2022 | Auerbach et al. | |
| 11,465,734 B1 | 10/2022 | Wiegman | |
| 11,592,846 B1 | 2/2023 | Wiegman | |
| 11,634,236 B2 | 4/2023 | Hedrick et al. | |
| 11,651,695 B2 | 5/2023 | Lax et al. | |
| 11,674,407 B2 | 6/2023 | Feulner | |
| 11,803,197 B2 | 10/2023 | Wiegman | |
| 2008/0133069 A1 | 6/2008 | Morales De La Rica et al. | |
| 2011/0202205 A1 | 8/2011 | Pepitone et al. | |
| 2012/0215505 A1 | 8/2012 | Srivastav et al. | |
| 2014/0232568 A1 | 8/2014 | Pennell et al. | |
| 2015/0134151 A1 | 5/2015 | Swann | |
| 2015/0197335 A1* | 7/2015 | Dekel | B64U 30/10 701/5 |
| 2015/0262492 A1 | 9/2015 | Barnes et al. | |
| 2016/0171896 A1 | 6/2016 | Buchmueller et al. | |
| 2016/0216130 A1 | 7/2016 | Abramson et al. | |
| 2016/0347479 A1 | 12/2016 | O'Neil et al. | |
| 2017/0069214 A1 | 3/2017 | Dupray et al. | |
| 2019/0005828 A1 | 1/2019 | Costas | |
| 2020/0023955 A1 | 1/2020 | Worsham, II et al. | |
| 2020/0094952 A1 | 3/2020 | Cerqueira | |
| 2020/0273357 A1 | 8/2020 | Chartier et al. | |
| 2020/0277081 A1 | 9/2020 | Krenz | |
| 2020/0346769 A1 | 11/2020 | Knapp et al. | |
| 2020/0388092 A1* | 12/2020 | Manoukian | B64D 31/00 |
| 2020/0388169 A1 | 12/2020 | Barr et al. | |
| 2020/0401142 A1 | 12/2020 | Abdelli | |
| 2021/0056859 A1 | 2/2021 | Tachiiwa | |
| 2021/0089055 A1 | 3/2021 | Tran | |
| 2021/0104164 A1 | 4/2021 | Erignac | |
| 2021/0110723 A1 | 4/2021 | Tazume | |
| 2021/0253225 A1 | 8/2021 | Albert | |
| 2021/0339885 A1 | 11/2021 | Doherty et al. | |
| 2021/0358310 A1 | 11/2021 | Sachs et al. | |
| 2021/0375123 A1* | 12/2021 | Friedman | G08B 31/00 |
| 2022/0058959 A1 | 2/2022 | Ota et al. | |
| 2022/0327937 A1 | 10/2022 | Ayhan et al. | |
| 2022/0334595 A1 | 10/2022 | Famularo et al. | |
| 2023/0083902 A1 | 3/2023 | Wiegman | |
| 2023/0084918 A1 | 3/2023 | Wiegman | |
| 2023/0152823 A1 | 5/2023 | Wiegman | |
| 2023/0227146 A1 | 7/2023 | Richter et al. | |
| 2023/0415915 A1 | 12/2023 | Moy | |
| 2024/0004404 A1 | 1/2024 | Wiegman | |
| 2026/0109459 A1 | 4/2026 | Wiegman | |

OTHER PUBLICATIONS

Non-Final Office Action for related U.S. Appl. No. 17/852,299, mailed on Feb. 16, 2024, to Moy, entitled "Transition Gauge for Electric Aircraft" (18 Pages).

Final Office Action for related U.S. Appl. No. 17/852,299 mailed Jun. 3, 2024 to Moy, entitled "Transition Gauge for Electric Aircraft" (17 pages).

* cited by examiner

TRANSITION GAUGE FOR ELECTRIC AIRCRAFT

CROSS REFERENCE TO RELATED APPLICATION

This application is a continuation of and claims priority to pending U.S. patent application Ser. No. 17/852,299, filed on Jun. 28, 2022, entitled "TRANSITION GAUGE FOR ELECTRIC AIRCRAFT", and is fully incorporated by reference herein.

FIELD OF THE INVENTION

The present invention generally relates to the field of electric aircraft. In particular, the present invention is directed to a transition gauge for an electric aircraft.

BACKGROUND

Modern aircraft, such as vertical landing and takeoff aircraft (VTOL) may include a set of rotors. Electric aircraft may transition from vertical flight to edgewise flight.

SUMMARY OF THE DISCLOSURE

In an aspect, a transition gauge is provided. The propulsor gauge includes: a processor; a memory communicatively connected to the processor and configured to contain instructions configuring processor to: identify a thrust envelope parameter of the propulsor; determine a recommended range as a function of the propulsor parameter, wherein the recommended range comprises a lower threshold and an upper threshold; an indicator configured to indicate the thrust envelope parameter; and a display communicatively connected to the processor and configured to display a visual representation of the recommended range.

In an aspect, a method for transitioning between vertical flight and edgewise flight using a transition gauge is provided. The method includes identifying, by a propulsor, a thrust envelope parameter of a propulsor of an electric aircraft, determining, by a propulsor, a recommended range as a function of the propulsor parameter, wherein the recommended range comprises a lower threshold and an upper threshold, indicating, by an indicator, a thrust envelope parameter, and displaying, by a display communicatively connected to the processor, a visual representation of the recommended range.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Figure 1:
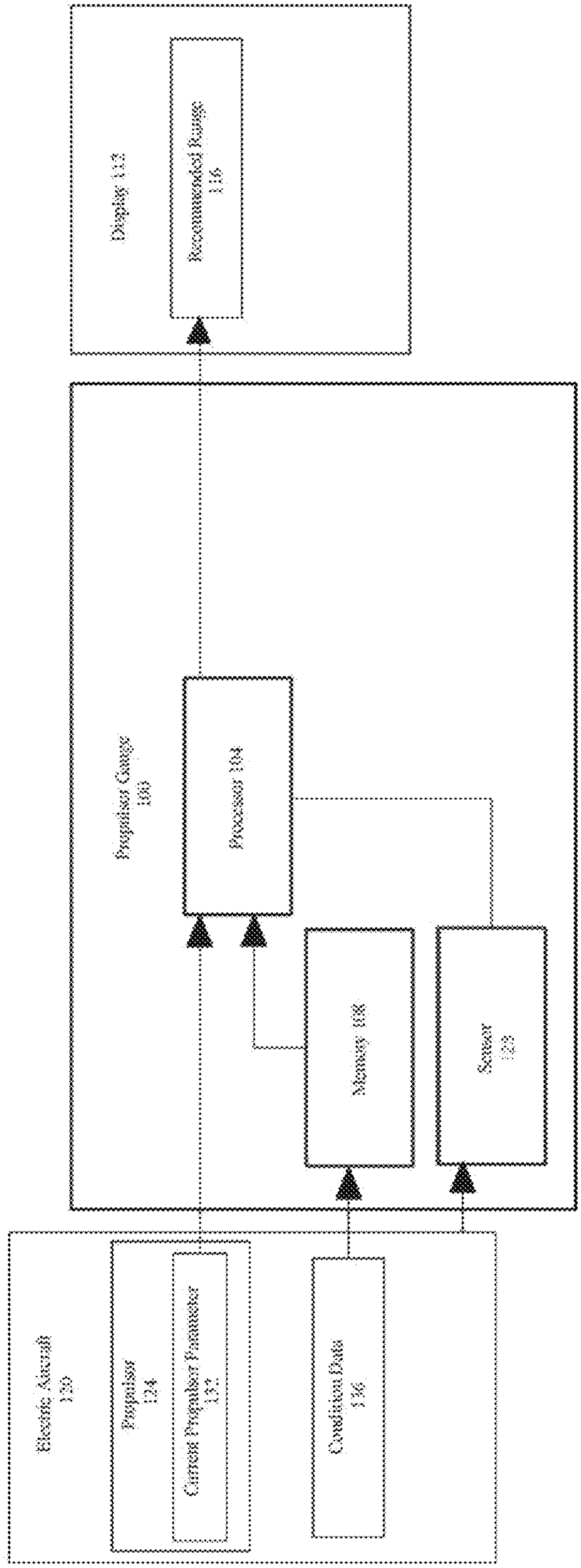
FIG. 1 is a block diagram of an exemplary embodiment of a propulsor gauge in accordance with one or more embodiments of the present disclosure.

Now referring to the drawings, FIG. 1 illustrates an exemplary embodiment of a propulsor transition gauge 100 in accordance with one or more embodiments of the present disclosure. In one or more embodiments, propulsor gauge 100 (also referred to in this disclosure as a "gauge", "transition gauge", or "propulsor gauge") may include a digital primary flight display (PFD). As discussed further below, gauge 100 is configured to guide a pilot through a transition of an aircraft propulsion assembly, such as a propulsor, during flight. For the purposes of this disclosure, a "transition" is a change of a propulsion assembly between a vertical flight position to a horizontal flight position. A propulsion assembly may include, for example and without limitation, a propulsor, which may include a rotor or propeller. In some embodiments, gauge 100 may include a tachometer that measures and shows a working speed, such as revolutions per minute (RPM) of one or more propulsors of an electric aircraft. In one or more embodiments, gauge 100 may include a processor 104. Processor 104 may be in communication with a computing device or be part of a computing device. Processor 104 may include any computing device as described in this disclosure, including without limitation a processor (e.g., processor 104), control circuit, microcontroller, microprocessor, digital signal processor (DSP), system on a chip (SoC), and the like. Computing device may include a computer system with one or more processors (e.g., CPUs), a graphics processing unit (GPU), or any combination thereof. In some embodiments, computing device may include a memory 108. In other embodiments, computing device and/or processor may be communicatively connected to and separately from memory 108. Memory 108 may include a memory, such as a main memory and/or a static memory, as discussed further in this disclosure below. In some embodiments, computing device may include a display 112, as discussed further below in the disclosure. In other embodiments, computing device and/or processor may be separate and communicatively connected to display 112. In one or more embodiments, computing device may include, be included in, and/or communicate with a mobile device, such as a mobile telephone, smartphone, tablet, and the like. In one or more embodiments, computing device may include an electronic flight instrument system (EFIS) in a cockpit of an electric aircraft. Computing device may be part of or in communication with a glass cockpit or a round dial cockpit. Computing device may include a single computing device operating independently, or may include two or more computing devices operating in concert, in parallel, sequentially, or the like. Two or more computing devices may be included together in a single computing device or in two or more computing devices. Computing device may interface or communicate with one or more additional devices, as described below in further detail, via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, any combination thereof, and the like. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device Or cluster of computing devices in a second location. Computing device may include one or more computing devices dedicated to data storage, security, distribution of traffic for load balancing, and the like. Computing device may distribute one or more computing tasks, as described below, across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of gauge and/or corresponding computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or a sequence of steps repeatedly until a desired outcome or commanded outcome is achieved. Repetition of a step or a sequence of steps may be performed iteratively and/or recursively using outputs of previous repetitions as inputs to subsequent repetitions, aggregating inputs, and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like. Division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, gauge 100 includes memory 108. Memory 108 may be communicatively connected to processor 104 and may be configured to store information and/or data related to gauge 100, such as propulsor data, environment data, electric aircraft data, and the like. Memory 108 may include one or more memory devices to store data and information and/or datum related to a slight transition of electric aircraft 120. Memory 108 may include various types of memory for such information storage, such as EEPROM (Electrically-Erasable Read-Only Memory), flash memory, volatile memory, non-volatile memory, RAM (Random-Access Memory), ROM (Read-Only Memory), a disk drive, and the like. In various embodiments, processor 104 may be configured to execute software instructions stored on memory 108 to perform various methods, processes, or operations in the manner described in this disclosure. In one or more embodiments, memory 108 is communicatively connected to processor 104 and configured to contain instructions configuring processor 104 to determine a recommended range 116, as discussed further below in this disclosure. In one or more embodiments, recommended range 116 may include a recommended range for, for example, one or more thrust parameters. In some embodiments, recommended range 116 may include a recommended range for a velocity of electric aircraft 120. In some embodiments, recommended range 116 may include a recommended range for an attitude of electric aircraft 120. Memory component 140 may be configured to store information and data related to recommended range 116, electric aircraft 120, parameters, and the like. In one or more embodiments, memory 108 may include a storage device, as described further in this disclosure below. In one or more embodiments, memory 108 may store a database such as a database related to electric aircraft. Memory 108 may store upper and lower bounds of a band of gauge 100 in a lookup table, as discussed further below in this disclosure. In one or more embodiments, recommended range 116 may be determined using machine-learning. For instance, and without limitation, a generated machine-learning model may determine gradations of recommended range 116. A gradation may include various recommended parameters based on desirability for reducing load on electric aircraft while maintaining lift during flight transition. For example, and without limitation, a first gradation may represent an optimal or targeted zone, where an optimal zone is an ideal zone that a user should stay within, such as a recommended range 116. A second gradation may include a buffer zone, which may include an upper bound and a lower bound, as discussed further in this disclosure. An upper bound may be, for example and without limitation, related to structural limitations. For instance, and without limitation, as electric aircraft moves forward in horizontal flight, loads get added to rotational velocity of lift propulsors, which result in high loads. Furthermore, lift propulsors may experience a rolling moment when aircraft is moving horizontally as a result in difference in lift generated by the proceeding propulsor and the receding propulsor. A lower bound may be, for example and without limitation, related to lift and the avoidance of downwash from lift propulsors. For instance, and without limitation, if lift propulsors begin moving in their own previously created downwash, which results in turbulence and a decrease in lift, then electric aircraft will begin to descend and/or fall. Lower bound and upper bound may not be recommended like an optimal zone, but a user may allow a thrust envelope parameter to reside in lower or upper bound without hazardous repercussions, such as dangerous loads on propulsor or insufficient lift due to downwash. Upper and lower bound provide. Machine-learning model may modify gradations based on various factors and/or parameters, such as external factors like forward speed, exterior temperature, motor temperature, and the like. For example, and without limitation, an upper bound for an RPM parameter may be lowered if speed is increase or if an external and/or environmental ambient temperature is high. In another example, and without limitations, a lower bound may be increased if fixed wings of an electric aircraft begin to generate lift. In one or more embodiments, gradations may be determined using machine-learning, as previously mentioned in this disclosure. In other embodiments, gradations may be determined using, for example, a lookup table. A lookup table may be stored in a database, such as in a memory of computing device, or may be retrieved from, for example, a third-party application. Computing device may retrieve or receive information from lookup table to display gradations, such as recommended range 116.

In one or more embodiments, gauge 100 may be used on any aircraft capable of transitioning a flight mode (e.g., from hover to conventional flight, or vice versa). For example, aircraft may include an electric vertical takeoff and landing (eVTOL), a VTOL, a tilt rotor, a tiltwing, and/or a helicopter. Aircraft may include an electric aircraft, which may be any aircraft powered by electricity, such as one or more electric motors and/or battery systems. In some embodiments, electric aircraft may be powered solely by electricity. In other embodiments, electric aircraft may be partially powered by electricity, such as a hybrid-electric aircraft. Gauge 100 may assist a pilot in a transition of an aircraft by providing a recommended range of operation, such as a recommended range for an RPM of a propulsor of aircraft, which must be maintained by a thrust envelope parameter, such as a current RPM of a propulsor, to safely and readily transition aircraft from one mode of flight to another mode of flight, as discussed in further detail below. Transition between flight modes of an electric aircraft may be consistent with disclosure of U.S. patent application Ser. No. 17/825,371 filed on May 26, 2022, and titled "AN APPARATUS FOR GUIDING A TRANSITION BETWEEN FLIGHT MODES OF AN ELECTRIC AIRCRAFT", the entirety of which is incorporated by reference herein in its entirety.

With continued reference to FIG. 1, processor 104 is configured to identify a thrust envelope parameter 132 of propulsor 124. For the purposes of this disclosure, a "thrust envelope parameter" is a characteristic of a propulsor, such as a propeller, in real time. Thrust envelope parameter 132 may include a rotational speed or revolutions per minute (RPM) of propulsor 124 and/or a corresponding motor of propulsor 124. Processor 104 may identify thrust envelope parameter 132 by receiving a detected measurement from a sensor 128, as discussed further in this disclosure. Though thrust envelope parameter is described as an RPM of a motor of electric aircraft during flight transition, as understood by one of ordinary skill in the art, thrust envelope parameter may be applicable to other parameters of flight of electric aircraft, such as an angle of attack, thrust, torque, power consumption, angular velocity, climb rate, structural limitations of electric aircraft, environmental and/or external limitations surrounding electric aircraft, and the like. In one or more embodiments, thrust envelope parameter may include a parameter used by an electric aircraft to transition between vertical flight and horizontal flight and to maintain a correct amount of lift by the electric aircraft during the transition of operation modes.

In one or more embodiments, sensor 128 may include an encoder. A detected measurement may include a direct reading of a speed or RPM of propulsor 124. Detected measurement may include measurements of other characteristics of propulsor 124 that may be used by processor 104 to calculate thrust envelope parameter 132. For example, a measurement of an actuation of a pilot control, such as a pushing of a throttle lever, may be used to identify a thrust envelope parameter. A pilot control may include, for example and without limitation, a wheel, pedal, button, switch, knob, lever, stick, or any other device and or mechanism used by a pilot to control movement of electric aircraft 120 through a medium. Gauge may indicate a rotational speed of one or more propulsor and/or motor or shaft operatively connected to propulsor 124. Thrust envelope parameter 132 may include lift, torque, motor current, motor voltage, propulsor angle and/or tilt, and the like. In some cases, thrust envelope parameter 132 includes a unitless or proportional parameter, such as speed or throttle. In other cases, thrust envelope parameter 132 may include a pilot input position, such as an angular position on lift lever or throttle wheel, as previously mentioned above. In one or more embodiments, sensor 128 may include one or more shaft (rotary type) encoder, photoelectric (optical type) sensor, and/or magnetic rotational speed (proximity type) sensor to detect an RPM or rotational speed of motor and/or propulsor 124 of electric aircraft 120.

Still referring to FIG. 1, a sensor 128 may be communicatively connected to processor 104. Sensor 128 may be configured to detect and transmit a thrust envelope parameter 132, condition data 136, and the like. For the purposes of this disclosure, condition data 136 is any factor or characteristic of electric aircraft that may affect a transition of flight of electric aircraft. In one or more embodiments, a condition datum may include an RPM, angle of attack, thrust, torque, power consumption, angular velocity, climb rate, structural limitations of electric aircraft, environmental and/or external limitations surrounding electric aircraft, such as wind or an ambient temperature of an external environment of electric aircraft, a power source condition, and the like. In one or more embodiments, thrust envelope parameter may include a parameter indicating a used by an electric aircraft to transition between vertical flight and horizontal flight and to maintain a correct amount of lift by the electric aircraft during the transition of operation modes. In one or more embodiments, thrust envelope parameter and condition data may be inputted by, for example, a user, or detected by, for example, a sensor, such as sensor 128. Sensor 128 may include one or more sensors. For example, sensor 128 may include a sensor array or a plurality of individual sensors.

In one or more embodiments, sensor 128 may include an encoder. In one or more embodiments, gauge 100 and/or electric aircraft 120 may include an encoder. An encoder may be configured to detect and determine a motion of motor of propulsor 124. For example, and without limitation, encoder may be a rotary encoder. In one or more exemplary embodiments, encoder is configured to determine a motion of motor and/or propulsor, such as a speed in revolutions per minute of motor. Encoder is configured to transmit an output signal, which may include feedback, to processor 104.

Still referring to FIG. 1, sensor 128 may include a motion sensor. A "motion sensor," for the purposes of this disclosure, refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Sensor 128 may include, torque sensor, gyroscope, accelerometer, magnetometer, inertial measurement unit (IMU), pressure sensor, force sensor, proximity sensor, displacement sensor, vibration sensor, or the like. For example, without limitation, sensor 128 may include a gyroscope that is configured to detect a current aircraft orientation, such as roll angle.

In one or more embodiments, sensor 128 may include a plurality of weather sensors. In one or more embodiments, sensor 128 may include a wind sensor. In some embodiments, a wind sensor may be configured to measure a wind datum. A "wind datum" may include data of wind forces acting on an aircraft. Wind datum may include wind strength, direction, shifts, duration, or the like. For example, and without limitations, sensor 128 may include an anemometer. An anemometer may be configured to detect a wind speed. In one or more embodiments, the anemometer may include a hot wire, laser doppler, ultrasonic, and/or pressure anemometer. In some embodiments, sensor 128 may include a pressure sensor. "Pressure," for the purposes of this disclosure and as would be appreciated by someone of ordinary skill in the art, is a measure of force required to stop a fluid from expanding and is usually stated in terms of force per unit area. The pressure sensor that may be included in sensor 200 may be configured to measure an atmospheric pressure and/or a change of atmospheric pressure. In some embodiments, the pressure sensor may include an absolute pressure sensor, a gauge pressure sensor, a vacuum pressure sensor, a differential pressure sensor, a sealed pressure sensor, and/or other unknown pressure sensors or alone or in a combination thereof. In one or more embodiments, a pressor sensor may include a barometer. In some embodiments, a pressure sensor may be used to indirectly measure fluid flow, speed, water level, and altitude. In some embodiments, the pressure sensor may be configured to transform a pressure into an analogue electrical signal. In some embodiments, the pressure sensor may be configured to transform a pressure into a digital signal.

In one or more embodiments, sensor 128 may include an altimeter that may be configured to detect an altitude of aircraft 104. In one or more embodiments, sensor 128 may include a moisture sensor. "Moisture," as used in this disclosure, is the presence of water, this may include vaporized water in air, condensation on the surfaces of objects, or concentrations of liquid water. Moisture may include humidity. "Humidity," as used in this disclosure, is the property of a gaseous medium (almost always air) to hold water in the form of vapor. In one or more embodiments, sensor 128 may include an altimeter. The altimeter may be configured to measure an altitude. In some embodiments, the altimeter may include a pressure altimeter. In other embodiments, the altimeter may include a sonic, radar, and/or Global Positioning System (GPS) altimeter. In some embodiments, sensor 128 may include a meteorological radar that monitors weather conditions. In some embodiments, sensor 128 may include a ceilometer. The ceilometer may be configured to detect and measure a cloud ceiling and cloud base of an atmosphere. In some embodiments, the ceilometer may include an optical drum and/or laser ceilometer. In some embodiments, sensor 128 may include a rain gauge. The rain gauge may be configured to measure precipitation. Precipitation may include rain, snow, hail, sleet, or other precipitation forms. In some embodiments, the rain gauge may include an optical, acoustic, or other rain gauge. In some embodiments, sensor 128 may include a pyranometer. The pyranometer may be configured to measure solar radiation. In some embodiments, the pyranometer may include a thermopile and/or photovoltaic pyranometer. The pyranometer may be configured to measure solar irradiance on a planar surface. In some embodiments, sensor 128 may include a lightning detector. The lightning detector may be configured to detect and measure lightning produced by thunderstorms. In some embodiments, sensor 128 may include a present weather sensor (PWS). The PWS may be configured to detect the presence of hydrometeors and determine their type and intensity. Hydrometeors may include a weather phenomenon and/or entity involving water and/or water vapor, such as, but not limited to, rain, snow, drizzle, hail and sleet. In some embodiments, sensor 128 may include an inertia measurement unit (IMU). The IMU may be configured to detect a change in specific force of a body.

In one or more embodiments, sensor 128 may include a local sensor. A local sensor may be any sensor mounted to aircraft 104 that senses objects or phenomena in the environment around aircraft 104. Local sensor may include, without limitation, a device that performs radio detection and ranging (RADAR), a device that performs lidar, a device that performs sound navigation ranging (SONAR), an optical device such as a camera, electro-optical (EO) sensors that produce images that mimic human sight, or the like. In one or more embodiments, sensor 128 may include a navigation sensor. For example, and without limitation, a navigation system of aircraft 104 may be provided that is configured to determine a geographical position of aircraft 104 during flight. The navigation may include a Global Positioning System (GPS), an Attitude Heading and Reference System (AHRS), an Inertial Reference System (IRS), radar system, and the like.

In one or more embodiments, sensor 128 may include electrical sensors. Electrical sensors may be configured to measure voltage across a component, electrical current through a component, and resistance of a component. In one or more embodiments, sensor 128 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor 128, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

In one or more embodiments, sensor 128 may include a sensor suite which may include a plurality of sensors that may detect similar or unique phenomena. For example, in a non-limiting embodiment, sensor suite may include a plurality of accelerometers, a mixture of accelerometers and gyroscope. System 100 may include a plurality of sensors in the form of individual sensors or a sensor suite working in tandem or individually. A sensor suite may include a plurality of independent sensors, as described in this disclosure, where any number of the described sensors may be used to detect any number of physical or electrical quantities associated with an aircraft. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained. Sensor 128 may be configured to detect pilot input from pilot control and/or controller 112. In one or more embodiments, a pilot control may include buttons, switches, or other binary inputs in addition to, or alternatively than digital controls about which a plurality of inputs may be received. Pilot control may be configured to receive pilot input. Pilot input may include a physical manipulation of a control like a pilot using a hand and arm to push or pull a lever, or a pilot using a finger to manipulate a switch. Pilot input may include a voice command by a pilot to a microphone and computing system consistent with the entirety of this disclosure. One of ordinary skill in the art, after reviewing the entirety of this disclosure, would appreciate that this is a non-exhaustive list of components and interactions thereof that may include, represent, or constitute, at least aircraft command. A pilot control may include a throttle lever, inceptor stick, collective pitch control, steering wheel, brake pedals, pedal controls, toggles, joystick. One of ordinary skill in the art, upon reading the entirety of this disclosure would appreciate the variety of pilot input controls that may be present in an electric aircraft consistent with the present disclosure. Inceptor stick may be consistent with disclosure of inceptor stick in U.S. patent application Ser. No. 17/001,845 and titled "A HOVER AND THRUST CONTROL ASSEMBLY FOR DUAL-MODE AIRCRAFT", which is incorporated herein by reference in its entirety. Collective pitch control may be consistent with disclosure of collective pitch control in U.S. patent application Ser. No. 16/929,206 and titled "HOVER AND THRUST CONTROL ASSEMBLY FOR DUAL-MODE AIRCRAFT", which is incorporated herein by reference in its entirety. The manipulation of a pilot control may constitute an aircraft command. A pilot control may be physically located in the cockpit of an aircraft or remotely located outside of the aircraft in another location communicatively connected to at least a portion of the aircraft. A pilot input and/or control may include a collective, inceptor, foot bake, steering and/or control wheel, control stick, pedals, throttle levers, or the like. "Communicatively connected," for the purposes of this disclosure, is a process whereby one device, component, or circuit is able to receive data from and/or transmit data to another device, component, or circuit; communicative connecting may be performed by wired or wireless electronic communication, either directly or by way of one or more intervening devices or components. In an embodiment, communicatively connecting includes electrically coupling an output of one device, component, or circuit to an input of another device, component, or circuit. Communicatively connecting may be performed via a bus or other facility for intercommunication between elements of a computing device. Communicatively connecting may include indirect connections via "wireless" connection, low power wide area network, radio communication, optical communication, magnetic, capacitive, or optical coupling, or the like.

With continued reference to FIG. 1, system 100 includes sensor 128 communicatively connected to aircraft 104. Sensor 128 may be configured to detect, for example, a thrust envelope parameter 132 and/or a condition data 136. Condition datum, or the purposes of this disclosure, may include information and/or data related to actual motion, forces, moments, and/or torques acting on aircraft and/or describing an environmental phenomenon in the real world surrounding electric aircraft. For example, and without limitation, condition data 136 may include geographical data, wind data, electric aircraft specification data (e.g., aircraft type, weight, battery type, battery state of charge, and the like). Condition data 136 may also be used by processor 104, alone or in addition to thrust envelope parameter, to determine recommended range 116.

In various embodiments, sensor 128 may include an inertial measurement unit. An "inertial measurement unit," for the purposes of this disclosure, is an electronic device that measures and reports a body's specific force, angular rate, and orientation of the body, using a combination of accelerometers, gyroscopes, and magnetometers, in various arrangements and combinations.

In various embodiments, sensor 128 may include a plurality of sensors in the form of individual sensors or a sensor array. Sensor 128 may include a plurality of independent sensors, where any number of the described sensors may be used to detect any number of physical or electrical phenomenon associated with electric aircraft 120. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of sensor 128 to detect phenomenon may be maintained.

In various embodiments, sensor 128 may be communicatively connected to processor 104, memory 108, display 112, a pilot input, and/or a flight controller so that sensor 128 may transmit and/or receive signals. Signals may include electrical, electromagnetic, visual, audio, radio waves, or another undisclosed signal type alone or in combination. In one or more embodiments, processor 104 may receive an attitude of electric aircraft, such as a yaw, pitch, or roll from sensor 128. In one or more embodiments, processor 104 may be a proportional-integral-derivative (PID) controller. In other embodiments, processor 104 may be a flight controller, which is described further below.

With continued reference to FIG. 1, processor 104 is configured to determine a recommended range 116 as a function of condition parameter 132. In one or more embodiments, thrust envelope parameter 132 may include a current RPM of one or more propellers of electric aircraft. In other embodiments, processor 104 may be configured to determine recommended range 116 as a function of condition parameter 132 and/or condition data 136. Condition parameters may include environmental conditions, electric aircraft characteristics, and the like. For example, and without limitation, condition parameter 136 may include a wind characteristic experienced by electric aircraft. In another example, and without limitation, condition data 136 may include an angle and/or tilt of each propeller of electric aircraft. Condition data 136 may be inputted by a user or retrieved form a database or memory 108. For example, and without limitation, a lookup table and or database may be provided by a user or third-party application that includes electric aircraft specifications, such as, for example, information related to a type of electric aircraft, a battery amperage of electric aircraft, a battery voltage of electric aircraft, a propulsion assembly motor type, a propulsor type, a weight of electric aircraft 120, and the like. In or more embodiments, recommended range 116 may be determined using a machine-learning model, as discussed further below in this disclosure. Though recommended range 116 is described as a recommendation for a user staying in a predetermined RPM during flight transition, as understood by one of ordinary skill in the art, recommended range may be applicable to other parameters of flight of electric aircraft, such as an angle of attack, climb rate, structural limitations, environmental limitations, and the like. Other parameters may be shown in display 112 alone or together, as shown in FIG. 2 with a first parameter 220, a second parameter 224, and a third parameter 228.

In one or more embodiments, recommended range 116 may be updated. For example, and without limitation, an initial recommended range 116*a* may be adjusted to create an updated recommended range 116*b* based on an updated thrust envelope parameter and/or an updated condition data, as shown in FIG. 2. Recommended range may be continuously adjusted in real-time based on real-time thrust envelope parameters an/or condition data.

Figure 2:
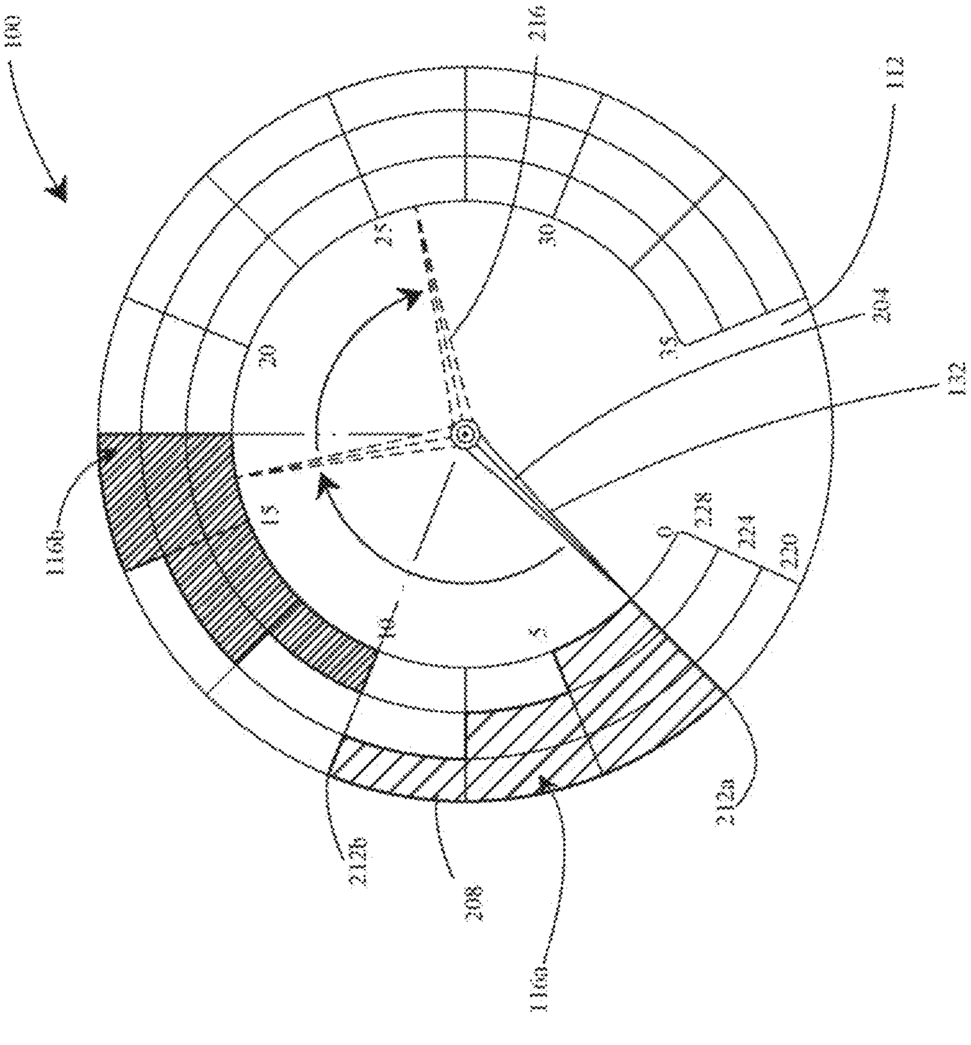
FIG. 2 is schematic diagram of the propulsor gauge in accordance with one or more embodiments of the present disclosure.

Now referring to FIG. 2, an exemplary embodiment of gauge 100 is shown. In one or more embodiments, gauge 100 includes display 112, which is configured to display, present, indicate, and/or otherwise visually and/or verbally convey data and/or information related to a flight transition of electric aircraft 120. For example, and without limitation, display 112 may show recommended range 116, thrust envelope parameter 132, condition data 136, and the like. In another example, and without limitation, information generated by processor 104 or sensor 128 may be shown by display 112. In other examples, and without limitation, information stored in and provided by memory 108 may be displayed on display 108. In various embodiments, display 108 may be implemented with an electronic display screen and/or monitor. Exemplary embodiments of electronic display screen may include a cathode ray tube (CRT), light-emitting diode (LED), liquid-crystal display (LCD), an opaque screen, and the like. In various embodiments, display 108 may be implemented with a projection screen and/or display. For example, and without limitation, display 108 may include a head-up display, a projector screen, a pico-projection display, a retinal display, and the like. In one or more embodiments, display 112 may include a monochrome or color display. Display 112 may be suitable for presenting a user-viewable image of one or more visual representations related to generated and/or provided information discussed in this disclosure. In some embodiments, gauge 100 may also be shown on an existing display of an external and/or remote device, such as a remote computing device, laptop, desktop, mobile phone, tablet, electric aircraft 120 information display system, or any other devices that may receive flight transition information from processor, sensor, memory, a remote computing device, and the like, to present flight transition information to a user. In some embodiments, display 112 may receive and display data and/or information converted and/or generated from processor 104. In other embodiments, display 108 may receive and display collected data and/or information directly from sensor 128. In other embodiments, display 112 may receive and show data and/or information stored and retrieved from memory 108. Data and information from memory 108 may be transferred from memory 108 via processor 104. Display 112 may be configured to present, indicate, or otherwise convey images and or symbols, such as text, related to a flight transition of electric aircraft 120.

With continued reference to FIG. 2, gauge 100 may include an indicator 204 (shown in FIG. 2) that represents a thrust envelope parameter 132, such as an RPM of motor and/or propulsor 124 of electric aircraft 120. Gauge 100 may include physical numerals indicating various values and/or units of a thrust envelope parameter. Indicator 204 may be a physical component moveably mounted to a backing, such as display 112. For example, and without limitation, indicator 204 may include a needle rotatably or slidable attached to display 112 or any other backing. In another example, and without limitation, indicator 204 may include one or more LEDs. In other embodiments, display 112 may show a visual representation of an indicator, such as a needle or other visual marker of a thrust envelope parameter, which indicates a current RPM of one or more propulsor assemblies of electric aircraft 120. For example, and without limitation, gauge 100 may be a display that generates an image mimicking an analog tachometer and/or measuring instrument. Indicator 204 may be coated in a luminescent or reflective paint or material to allow for indicator to be more readily seen by a user, such as self-illuminating tritium or a photoluminescent paint.

With continued reference to FIG. 2, display may show a real-time recommended range 116 that may range with real-time detections from sensors, information from processor 104, and/or inputs from a user, such as a pilot. A visual representation may be used to indicated recommended range 116. Visual representation of recommended range 116 may include a band 208. In some embodiments, band 208 may be a linear region indicated by colors or lines on display 112. In other embodiments, band 208 may include an arcuate region indicated by colors and/or lines on display 112. A position of indicator 204, which represents a thrust envelope parameter such as, for example, RPM of a motor of propulsor or a thrust of electric aircraft, must be maintained so that indicator 204 is directed at recommended range, e.g., pointing at a region between a lower bound 212*a* of recommended region 116 and upper bound 212*b* of recommended region 116. Lower bound 212*a* may represent a lower threshold of recommended range 116, and upper bound 212*b* may represent an upper threshold of recommended range 116. For a safe and proper transition of modes of operation of electric aircraft a user must use a pilot control to keep indicator 204 between the upper bound and the lower bound of recommended range 116. In some embodiments, lower and upper bound may be generated to include a safety feature, where a standard deviation of error may be included so that recommended range includes relief for user and/or environmental error.

In one or more embodiments, gauge 100 may include an alert component, which may be activated if a position of indicator 204 is outside of recommended range 116, such as position 216 of indicator 204. Alert component may include one or more visual components, audio components, haptic components, and the like. For example, and without limitation, alert component may include a haptic component where a user may feel a vibration in a pilot input when a user deviates outside of recommended range 116 or is close to deviating outside of recommended range 116. In another example, and without limitation, display 112 or a light-emitting diode (LED) may flash to indicate to a user that the user is deviating from a recommended range. Haptic components may include mechanical vibrators, piezoelectric components, or other movable components for generating motion that alerts a user that a recommended range is being exceeded. Audio components may include one or more speakers. Light-emitting components may include one or more light bulbs, LEDs, at least a portion of display 112, and the like.

Figure 3:
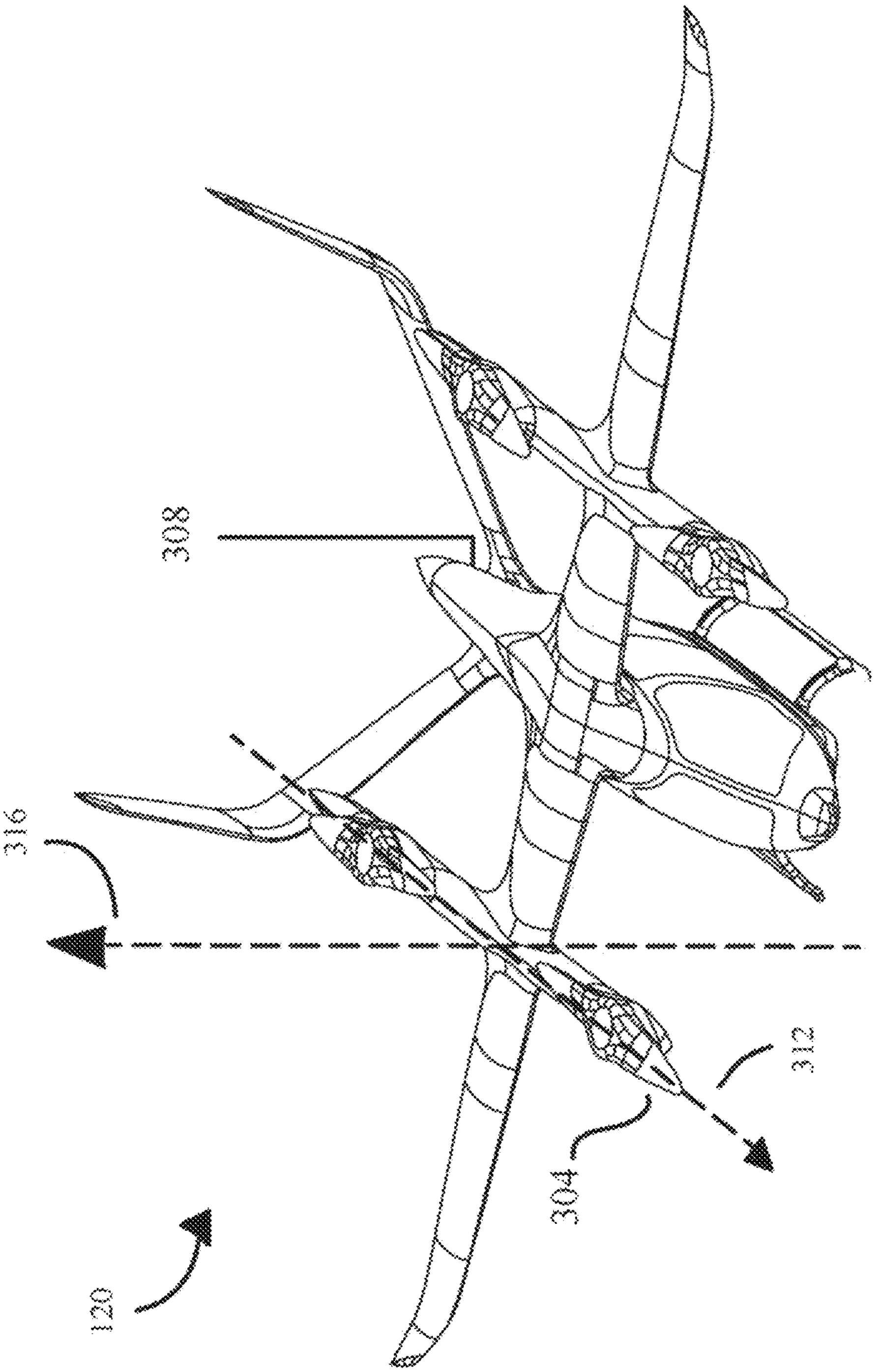
FIG. 3 is a schematic diagram of an exemplary embodiment of an electric aircraft in accordance with one or more embodiments of the present disclosure.

Sensor 128 may collect data related to a flight transition of electric aircraft 120. Sensor 128 may include one or more sensors. For example, and without limitation, sensor 128 may include a plurality of sensors. Such as a sensor array. Display may display measured and/or detected parameters from sensor 128. Display 112 may be a touchscreen and, thus, provide controls of gauge 100 using screen. In other embodiments, gauge 100 may include a user interface, such as a mechanical interface, with actuated components that are adapted to generate one or more user actuated input control signals. Controls may include one or more buttons, switches, sliders, joysticks, keyboard, pedals, rotatable knobs, a peripheral device, remote device, and the like, that allow a user to navigate an interface, such as a graphic user interface (GUI), displayed on display 112. For example, and without limitation, a user may use controls to toggle between various units of displayed information (e.g., miles per hour (mph), kilometers per hour (kph), revolutions per minute (RPM), and the like) or various menus of graphic user interface or various versions of displaying information (e.g., such as a circular display versus a linear display as shown in FIG. 2 and FIG. 3, respectively). In one or more embodiments, processor 104 may process detected sensor data from sensor 128. Processor may then present processed sensor data to a user via display 112.

User interface may be adapted to be integrated as part of display 112 to function as both a user input device and a display device, such as, for example, a touch screen device adapted to receive input signals from a user touching different parts of a screen of display 112. Processor may be configured to sense a user control input signal from user interface and respond to sensed control input signals received therefrom.

Referring now to FIG. 3, an illustration of an exemplary embodiment of aircraft 120 is shown. In some embodiments, aircraft 120 may include an electric aircraft. In some embodiments, aircraft 120 may include a vertical takeoff and landing aircraft (eVTOL). As used herein, a vertical take-off and landing (eVTOL) aircraft is one that may hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 1, a number of aerodynamic forces may act upon the electric aircraft 120 during flight. Forces acting on an aircraft 120 during flight may include, without limitation, thrust, the forward force produced by the rotating element of the aircraft 120 and acts parallel to the longitudinal axis. Another force acting upon aircraft 120 may be, without limitation, drag, which may be defined as a rearward retarding force which is caused by disruption of airflow by any protruding surface of the aircraft 120 such as, without limitation, the wing, rotor, and fuselage. Drag may oppose thrust and acts rearward parallel to the relative wind. A further force acting upon aircraft 120 may include, without limitation, weight, which may include a combined load of the electric aircraft 120 itself, crew, baggage, and/or fuel. Weight may pull aircraft 120 downward due to the force of gravity. An additional force acting on aircraft 120 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, aircraft 120 are designed to be as lightweight as possible. Reducing the weight of the aircraft and designing to reduce the number of components is essential to optimize the weight.

Referring still to FIG. 3, aircraft 120 may include at least a vertical propulsor 304 and at least a forward propulsor 308. A forward propulsor is a propulsor that propels the aircraft in a forward direction. Forward in this context is not an indication of the propulsor position on the aircraft; one or more propulsors mounted on the front, on the wings, at the rear, etc. A vertical propulsor is a propulsor that propels the aircraft in an upward direction; one of more vertical propulsors may be mounted on the front, on the wings, at the rear, and/or any suitable location. A propulsor, as used herein, is a component or device used to propel a craft by exerting force on a fluid medium, which may include a gaseous medium such as air or a liquid medium such as water. At least a vertical propulsor 304 is a propulsor that generates a substantially downward thrust, tending to propel an aircraft in a vertical direction providing thrust for maneuvers such as without limitation, vertical take-off, vertical landing, hovering, and/or rotor-based flight such as "quadcopter" or similar styles of flight.

With continued reference to FIG. 3, at least a forward propulsor 308 as used in this disclosure is a propulsor positioned for propelling an aircraft in a "forward" direction; at least a forward propulsor may include one or more propulsors mounted on the front, on the wings, at the rear, or a combination of any such positions. At least a forward propulsor may propel an aircraft forward for fixed-wing and/or "airplane"-style flight, takeoff, and/or landing, and/or may propel the aircraft forward or backward on the ground. At least a vertical propulsor I 04 and at least a forward propulsor I 08 includes a thrust element. At least a thrust element may include any device or component that converts the mechanical energy of a motor, for instance in the form of rotational motion of a shaft, into thrust in a fluid medium. At least a thrust element may include, without limitation, a device using moving or rotating foils, including without limitation one or more rotors, an airscrew or propeller, a set of airscrews or propellers such as contrarotating propellers, a moving or flapping wing, or the like. At least a thrust element may include without limitation a marine propeller or screw, an impeller, a turbine, a pump-jet, a paddle or paddle-based device, or the like. As another non-limiting example, at least a thrust element may include an eight-bladed pusher propeller, such as an eight-bladed propeller mounted behind the engine to ensure the drive shaft is in compression. Propulsors may include at least a motor mechanically coupled to the at least a first propulsor as a source of thrust. A motor may include without limitation, any electric motor, where an electric motor is a device that converts electrical energy into mechanical energy, for instance by causing a shaft to rotate. At least a motor may be driven by direct current (DC) electric power; for instance, at least a first motor may include a brushed DC at least a first motor, or the like. At least a first motor may be driven by electric power having varying or reversing voltage levels, such as alternating current (AC) power as produced by an alternating current generator and/or inverter, or otherwise varying power, such as produced by a switching power source. At least a first motor may include, without limitation, brushless DC electric motors, permanent magnet synchronous at least a first motor, switched reluctance motors, or induction motors. In addition to inverter and/or a switching power source, a circuit driving at least a first motor may include electronic speed controllers or other components for regulating motor speed, rotation direction, and/or dynamic braking. Persons skilled in the art, upon reviewing the entirety of this disclosure, will be aware of various devices that may be used as at least a thrust element.

In some embodiments, aircraft 120 may be an eVTOL. In some embodiments, aircraft 120 may have one or more states, or modes, of operation and may transition between such modes of operation. Aircraft 120 may have a hover state. In a hover state, aircraft 120 may be moving through the air along a vertical path. In some embodiments, aircraft 120 may be in a hover state during liftoff operations. In another embodiment, aircraft 120 may be in a hover state in landing operations. In other embodiments, a hover state may be when aircraft 120 maintains an altitude when airborne. Aircraft 120 may use propulsors, such as vertical propulsor 304, to achieve ascent and descent in a hover state. In some embodiments, aircraft 120 may have a fixed-wing flight state. Aircraft 120 may be in a fixed-wing flight state during forward, backward, and sideways propulsion. A fixed-wing flight state may include edgewise flight. In some embodiments, aircraft 120 may have a first set of rotors for a hover state. In other embodiments, aircraft 120 may have a second set of rotors for a fixed-wing flight state. In some embodiments, aircraft 120 may use the same set of propulsors for both hover state and fixed-wing flight states.

In some embodiments, processor 104 may be configured to detect a plurality of flight operations of aircraft 120. In some embodiments, processor 104 may detect a change of aircraft 120 during a transition of aircraft 120 between a fixed-wing flight state and a hover state. For example, and without limitation, a magnetic element may be used to operably move rotor of propulsor. In some embodiments, rotor 116 and movement thereof may be as described in U.S. patent application Ser. No. 16/938,952, filed Jul. 25, 2020, titled "INTEGRATED ELECTRIC PROPULSION ASSEMBLY", of which is incorporated by reference herein in its entirety. In some embodiments, a rotor management system may be used to monitor an operation of electric aircraft such as a management system described in U.S. patent application Ser. No. 17/383,667, filed Jul. 23, 2021, entitled "SYSTEM AND METHOD OF ROTOR MANAGEMENT", which is incorporated by reference herein in its entirety. In other embodiments, processor 104 may determine a minimal drag axis based on surrounding airflow of aircraft 120. A drag minimization axis and determining thereof may be as described in U.S. patent application Ser. No. 17/362,454 filed Jun. 29, 2021, titled "METHOD OF PROPULSOR MANAGEMENT IN ELECTRIC AIRCRAFT", of which is incorporated herein by reference in its entirety.

Figure 4:
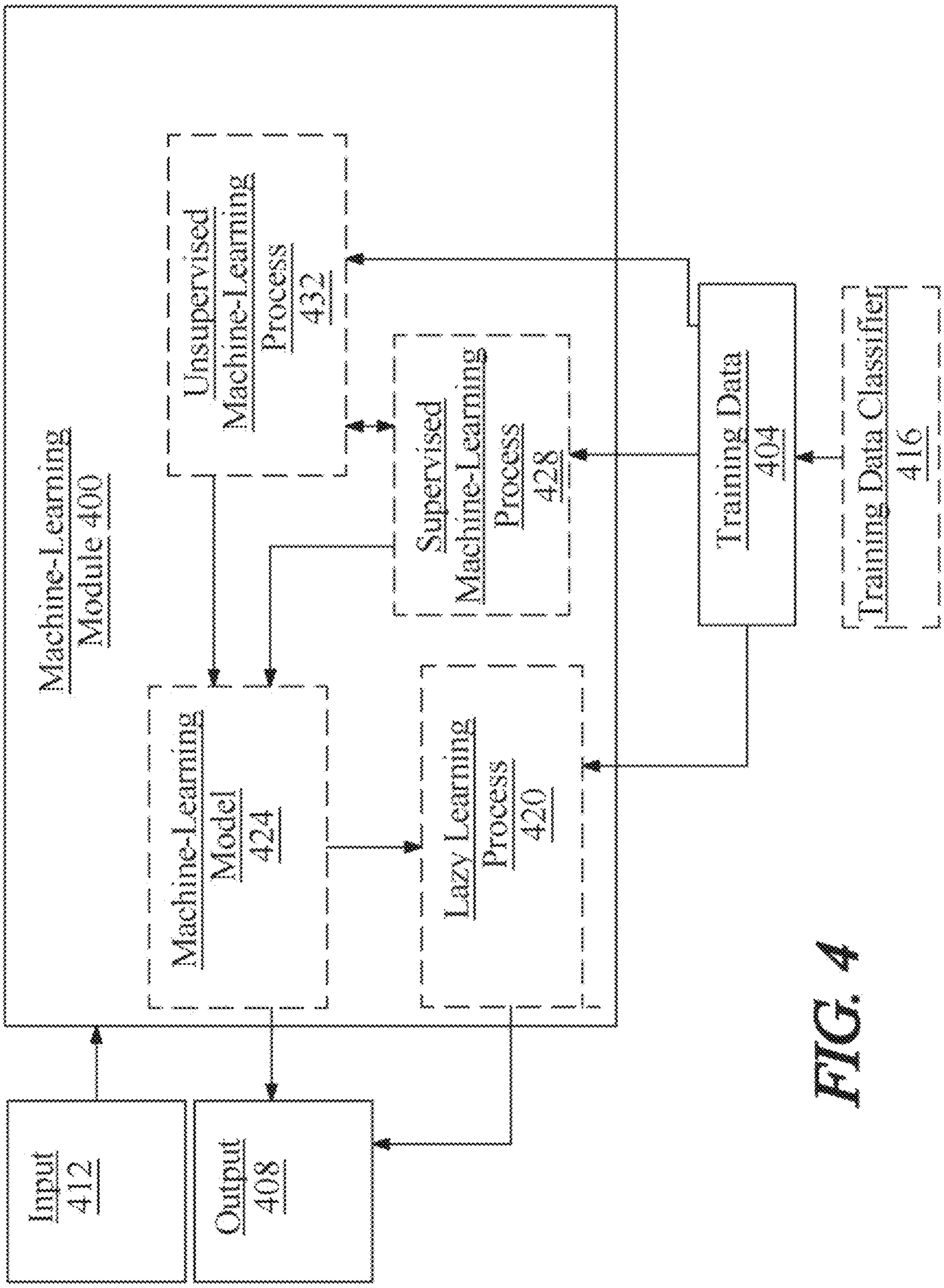
FIG. 4 is an exemplary embodiment of a machine-learning system in accordance with one or more embodiments of the present disclosure.

Referring now to FIG. 4, an exemplary embodiment of a machine-learning module 400 that may perform one or more machine-learning processes as described in this disclosure is illustrated. Machine-learning module 400 may be implemented in the determination of the flight states of the electric aircraft. Machine-learning module 400 may communicated with the flight controller to determine a minimal drag axis for the electric aircraft. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data.

Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example flight elements and/or pilot signals may be inputs, wherein an output may be an autonomous function.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such ask-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naive Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of I divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
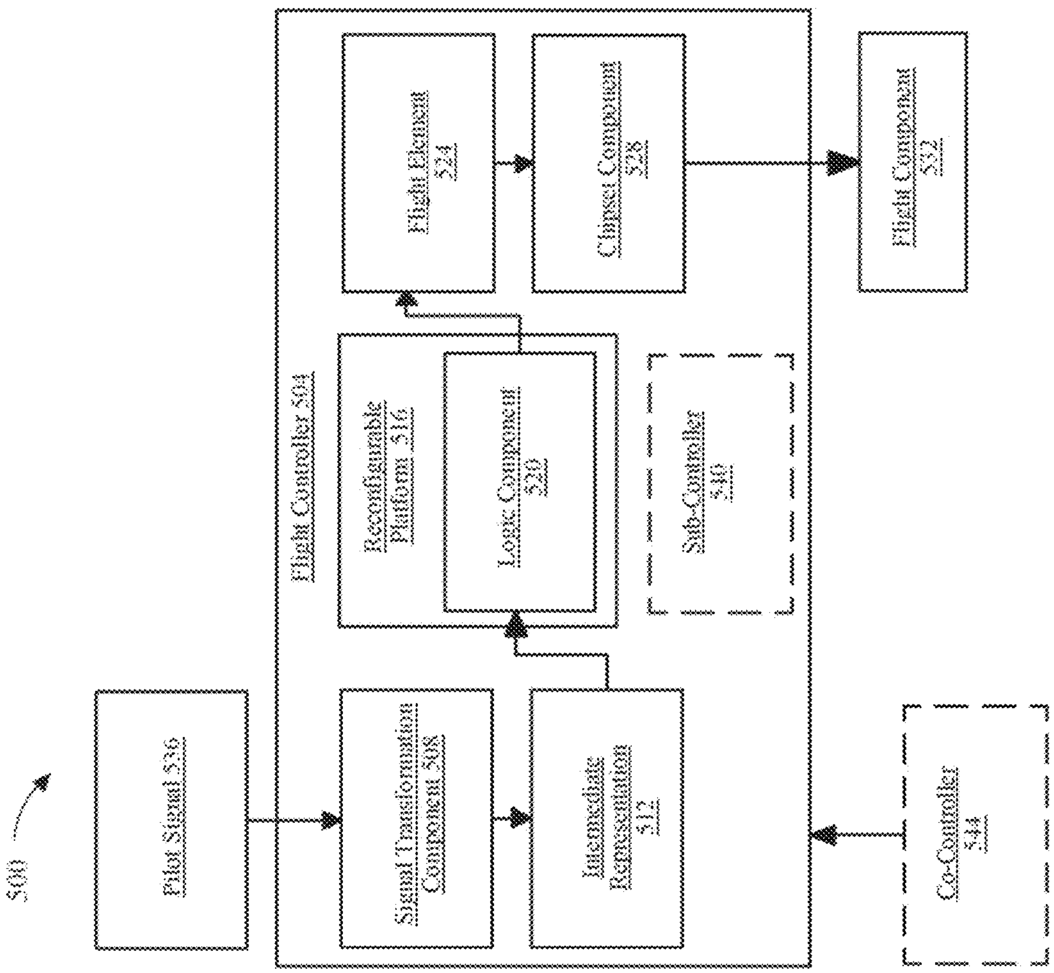
FIG. 5 is a block diagram of an exemplary embodiment of a flight controller system in accordance with one or more embodiments of the present disclosure.

Now referring to FIG. 5, an exemplary embodiment 500 of a flight controller 504 is illustrated. (Flight controller 124 of FIG. 1 and FIG. 2 may be the same as or similar to flight controller 504.) As used in this disclosure a "flight controller" is a computing device of a plurality of computing devices dedicated to data storage, security, distribution of traffic for load balancing, and flight instruction. Flight controller 504 may include and/or communicate with any computing device as described in this disclosure, including without limitation a microcontroller, microprocessor, digital signal processor (DSP) and/or system on a chip (SoC) as described in this disclosure. Further, flight controller 504 may include a single computing device operating independently, or may include two or more computing device operating in concert, in parallel, sequentially or the like; two or more computing devices may be included together in a single computing device or in two or more computing devices. In embodiments, flight controller 504 may be installed in an aircraft, may control the aircraft remotely, and/or may include an element installed in the aircraft and a remote element in communication therewith.

In an embodiment, and still referring to FIG. 5, flight controller 504 may include a signal transformation component 508. As used in this disclosure a "signal transformation component" is a component that transforms and/or converts a first signal to a second signal, wherein a signal may include one or more digital and/or analog signals. For example, and without limitation, signal transformation component 508 may be configured to perform one or more operations such as preprocessing, lexical analysis, parsing, semantic analysis, and the like thereof. In an embodiment, and without limitation, signal transformation component 508 may include one or more analog-to-digital convertors that transform a first signal of an analog signal to a second signal of a digital signal. For example, and without limitation, an analog-to-digital converter may convert an analog input signal to a I 0-bit binary digital representation of that signal. In another embodiment, signal transformation component 508 may include transforming one or more low-level languages such as, but not limited to, machine languages and/or assembly languages. For example, and without limitation, signal transformation component 508 may include transforming a binary language signal to an assembly language signal. In an embodiment, and without limitation, signal transformation component 508 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 5, signal transformation component 508 may be configured to optimize an intermediate representation 512. As used in this disclosure an "intermediate representation" is a data structure and/or code that represents the input signal. Signal transformation component 508 may optimize intermediate representation as a function of a data-flow analysis, dependence analysis, alias analysis, pointer analysis, escape analysis, and the like thereof. In an embodiment, and without limitation, signal transformation component 508 may optimize intermediate representation 512 as a function of one or more inline expansions, dead code eliminations, constant propagation, loop transformations, and/or automatic parallelization functions. In another embodiment, signal transformation component 508 may optimize intermediate representation as a function of a machine dependent optimization such as a peephole optimization, wherein a peephole optimization may rewrite short sequences of code into more efficient sequences of code. Signal transformation component 508 may optimize intermediate representation to generate an output language, wherein an "output language," as used herein, is the native machine language of flight controller 504. For example, and without limitation, native machine language may include one or more binary and/or numerical languages.

In an embodiment, and without limitation, signal transformation component 508 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 5, flight controller 504 may include a reconfigurable hardware platform 516. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 516 may be reconfigured to enact any algorithm and/or algorithm selection process received from another computing device and/or created using machine-learning processes.

Still referring to FIG. 5, reconfigurable hardware platform 516 may include a logic component 520. As used in this disclosure a "logic component" is a component that executes instructions on output language. For example, and without limitation, logic component may perform basic arithmetic, logic, controlling, input/output operations, and the like thereof. Logic component 520 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 520 may be organized according to Von Neumann and/or Harvard architecture as a non-limiting example. Logic component 520 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 520 may include one or more integrated circuit microprocessors, which may contain one or more central processing units, central processors, and/or main processors, on a single metal-oxide-semiconductor chip. Logic component 520 may be configured to execute a sequence of stored instructions to be performed on the output language and/or intermediate representation 512. Logic component 520 may be configured to fetch and/or retrieve the instruction from a memory cache, wherein a "memory cache," as used in this disclosure, is a stored instruction set on flight controller 504. Logic component 520 may be configured to decode the instruction retrieved from the memory cache to opcodes and/or operands. Logic component 520 may be configured to execute the instruction on intermediate representation 512 and/or output language. For example, and without limitation, logic component 520 may be configured to execute an addition operation on intermediate representation 512 and/or output language.

In an embodiment, and without limitation, logic component 520 may be configured to calculate a flight element 524. As used in this disclosure a "flight element" is an element of datum denoting a relative status of aircraft. For example, and without limitation, flight element 524 may denote one or more torques, thrusts, airspeed velocities, forces, altitudes, groundspeed velocities, directions during flight, directions facing, forces, orientations, and the like thereof. For example, and without limitation, flight element 524 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 524 may denote that aircraft is following a flight path accurately and/or sufficiently.

Still referring to FIG. 5, flight controller 504 may include a chipset component 528. As used in this disclosure a "chipset component" is a component that manages data flow. In an embodiment, and without limitation, chipset component 528 may include a northbridge data flow path, wherein the northbridge dataflow path may manage data flow from logic component 520 to a high-speed device and/or component, such as a RAM, graphics controller, and the like thereof. In another embodiment, and without limitation, chipset component 528 may include a southbridge data flow path, wherein the southbridge dataflow path may manage data flow from logic component 520 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 528 may manage data flow between logic component 520, memory cache, and a flight component 208. As used in this disclosure (and with particular reference to FIG. 5) a "flight component" is a portion of an aircraft that can be moved or adjusted to affect one or more flight elements. For example, flight component 208 may include a component used to affect the aircrafts' roll and pitch which may comprise one or more ailerons. As a further example, flight component 208 may include a rudder to control yaw of an aircraft. In an embodiment, chipset component 528 may be configured to communicate with a plurality of flight components as a function of flight element 524. For example, and without limitation, chipset component 528 may transmit to an aircraft rotor to reduce torque of a first lift propulsor and increase the forward thrust produced by a pusher component to perform a flight maneuver.

In an embodiment, and still referring to FIG. 5, flight controller 504 may be configured generate an autonomous function. As used in this disclosure an "autonomous function" is a mode and/or function of flight controller 504 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 524. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 504 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 504 will control the ailerons and/or rudders. As used in this disclosure "non-autonomous mode" is a mode that denotes a pilot will control aircraft and/or maneuvers of aircraft in its entirety.

In an embodiment, and still referring to FIG. 5, flight controller 504 may generate autonomous function as a function of an autonomous machine-learning model. As used in this disclosure an "autonomous machine-learning model" is a machine-learning model to produce an autonomous function output given flight element 524 and a pilot signal 536 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 536 may denote that a pilot is controlling and/or maneuvering ailerons, wherein the pilot is not in control of the rudders and/or propulsors. In an embodiment, pilot signal 536 may include an implicit signal and/or an explicit signal. For example, and without limitation, pilot signal 536 may include an explicit signal, wherein the pilot explicitly states there is a lack of control and/or desire for autonomous function. As a further non-limiting example, pilot signal 536 may include an explicit signal directing flight controller 504 to control and/or maintain a portion of aircraft, a portion of the flight plan, the entire aircraft, and/or the entire flight plan. As a further non-limiting example, pilot signal 536 may include an implicit signal, wherein flight controller 504 detects a lack of control such as by a malfunction, torque alteration, flight path deviation, and the like thereof. In an embodiment, and without limitation, pilot signal 536 may include one or more explicit signals to reduce torque, and/or one or more implicit signals that torque may be reduced due to reduction of airspeed velocity. In an embodiment, and without limitation, pilot signal 536 may include one or more local and/or global signals. For example, and without limitation, pilot signal 536 may include a local signal that is transmitted by a pilot and/or crew member. As a further non-limiting example, pilot signal 536 may include a global signal that is transmitted by air traffic control and/or one or more remote users that are in communication with the pilot of aircraft. In an embodiment, pilot signal 536 may be received as a function of a tri-state bus and/or multiplexor that denotes an explicit pilot signal should be transmitted prior to any implicit or global pilot signal.

Still referring to FIG. 5, autonomous machine-learning model may include one or more autonomous machine-learning processes such as supervised, unsupervised, or reinforcement machine-learning processes that flight controller 504 and/or a remote device may or may not use in the generation of autonomous function. As used in this disclosure "remote device" is an external device to flight controller 504. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naive bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 5, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 504 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 5, flight controller 504 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 504. Remote device and/or FPGA may transmit a signal, bit, datum, or parameter to flight controller 504 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example, a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 504 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 5, flight controller 504 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 5, flight controller 504 may include, but is not limited to, for example, a cluster of flight controllers in a first location and a second flight controller or cluster of flight controllers in a second location. Flight controller 504 may include one or more flight controllers dedicated to data storage, security, distribution of traffic for load balancing, and the like. Flight controller 504 may be configured to distribute one or more computing tasks as described below across a plurality of flight controllers, which may operate in parallel, in series, redundantly, or in any other manner used for distribution of tasks or memory between computing devices. For example, and without limitation, flight controller 504 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 5, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 208. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 5, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 504. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 512 and/or output language from logic component 520, wherein output language may include one or more analog-to-digital conversions, low bit rate transmissions, message encryptions, digital signals, binary signals, logic signals, analog signals, and the like thereof described above in detail.

Still referring to FIG. 5, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 5, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 5, flight controller 504 may also be implemented using a "shared nothing" architecture in which data is cached at the worker, in an embodiment, this may enable scalability of aircraft and/or computing device. Flight controller 504 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, a node may include, without limitation a plurality of inputs Xi that may receive numerical values from inputs to a neural network containing the node and/or from other nodes. Node may perform a weighted sum of inputs using weights Wi that are multiplied by respective inputs Xi. Additionally or alternatively, a bias b may be added to the weighted sum of the inputs such that an offset is added to each unit in the neural network layer that is independent of the input to the layer. The weighted sum may then be input into a function ($f$), which may generate one or more outputs y. Weight Wi applied to an input Xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights Wi may be determined by training a neural network using training data, which may be performed using any suitable process as described above. In an embodiment, and without limitation, a neural network may receive semantic units as inputs and output vectors representing such semantic units according to weights Wi that are derived using machine-learning processes as described in this disclosure.

Still referring to FIG. 5, flight controller may include a sub-controller 540. As used in this disclosure a "sub-controller" is a controller and/or component that is part of a distributed controller as described above; for instance, flight controller 504 may be and/or include a distributed flight controller made up of one or more sub-controllers. For example, and without limitation, sub-controller 540 may include any controllers and/or components thereof that are similar to distributed flight controller and/or flight controller as described above. Sub-controller 540 may include any component of any flight controller as described above. Sub-controller 540 may be implemented in any manner suitable for implementation of a flight controller as described above. As a further non-limiting example, sub-controller 540 may include one or more processors, logic components and/or computing devices capable of receiving, processing, and/or transmitting data across the distributed flight controller as described above. As a further non-limiting example, sub-controller 540 may include a controller that receives a signal from a first flight controller and/or first distributed flight controller component and transmits the signal to a plurality of additional sub-controllers and/or flight components.

Still referring to FIG. 5, flight controller may include a co-controller 544. As used in this disclosure a "co-controller" is a controller and/or component that joins flight controller 504 as components and/or nodes of a distributer flight controller as described above. For example, and without limitation, co-controller 544 may include one or more controllers and/or components that are similar to flight controller 504. As a further non-limiting example, co-controller 544 may include any controller and/or component that joins flight controller 504 to distributer flight controller. As a further non-limiting example, co-controller 544 may include one or more processors, logic components and/or computing devices capable of receiving, processing, and/or transmitting data to and/or from flight controller 504 to distributed flight control system. Co-controller 544 may include any component of any flight controller as described above. Co-controller 544 may be implemented in any manner suitable for implementation of a flight controller as described above.

In an embodiment, and with continued reference to FIG. 5, flight controller 504 may be designed and/or configured to perform any method, method step, or sequence of method steps in any embodiment described in this disclosure, in any order and with any degree of repetition. For instance, flight controller 504 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 6:
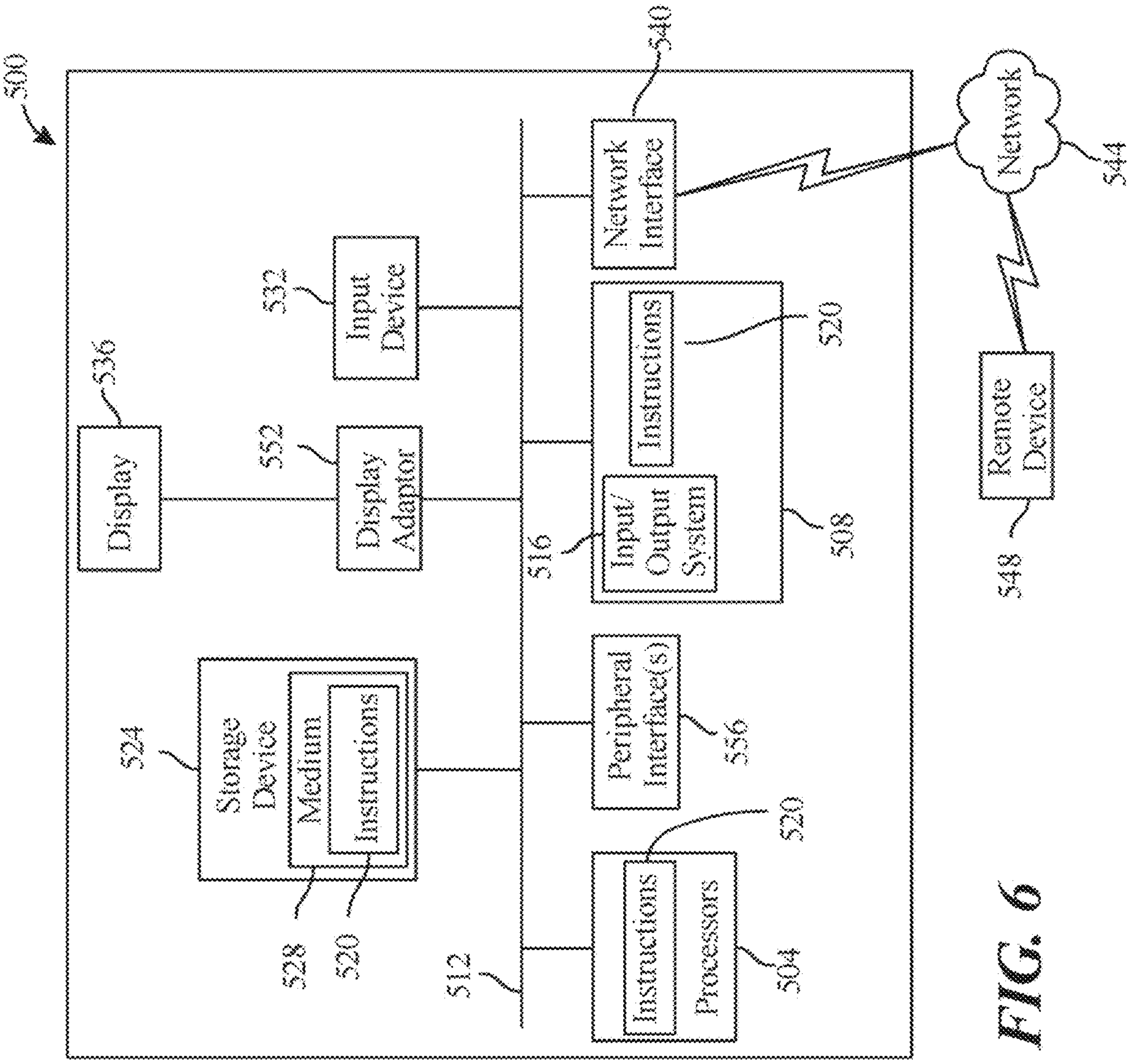
FIG. 6 is a block diagram of an exemplary embodiment of a computing system in accordance with one or more embodiments of the present disclosure.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An aircraft, comprising:
a propulsor;
a pilot control configured to control the propulsor based at least in part on a position of the pilot control;
a sensor configured to determine condition data of the aircraft;
a propulsor gauge configured to:
determine a thrust envelope parameter for the propulsor, wherein the thrust envelope parameter is associated with a transition between a hover flight state and a fixed-wing flight state;
determine at least one of a lower threshold of the thrust envelope parameter or an upper threshold of the thrust envelope parameter based at least in part on the condition data; and
determine the position of the pilot control; and
a display configured to:
display a visual representation of the thrust envelope parameter; and
update the visual representation of the thrust envelope parameter based at least in part on the position of the pilot control.

2. The aircraft of claim 1, wherein the propulsor gauge is further configured to determine the lower threshold based at least in part on one or more of a velocity of the aircraft, a rotational velocity of the propulsor, or an angle of attack of the aircraft.

3. The aircraft of claim 1, wherein the propulsor gauge is further configured to determine the upper threshold based at least in part on the condition data.

4. The aircraft of claim 1, wherein the propulsor is a lift propulsor.

5. The aircraft of claim 1, wherein the thrust envelope parameter indicates one or more of:
a rotational speed of the propulsor,
revolutions per minute of the propulsor,
a thrust of the propulsor,
a torque of the propulsor,
power consumption of the propulsor,
an angle of the propulsor,
a tilt of the propulsor,
a current at a motor of the propulsor, or
a voltage at a motor of the propulsor.

6. The aircraft of claim 1, wherein the thrust envelope parameter indicates one or more of:
an angle of attack,
a climb rate,
an angular velocity, or
an aircraft limitation.

7. The aircraft of claim 1, wherein the thrust envelope parameter indicates the position of the pilot control.

8. The aircraft of claim 1, wherein the visual representation comprises a band indicating an upper bound indicating the upper threshold and a lower bound indicating the lower threshold.

9. The aircraft of claim 1, wherein the propulsor gauge is further configured to:
identify an updated thrust envelope parameter; and
determine at least one of an updated upper threshold or an updated lower threshold based at least in part on the updated thrust envelope parameter.

10. The aircraft of claim 1, wherein the propulsor gauge is further configured to determine the upper threshold based at least in part on one or more of a velocity of the aircraft, a rotational velocity of the propulsor, or an angle of attack of the aircraft.

11. An aircraft, comprising:
a flight component;
a pilot control configured to control the flight component based at least in part on a position of the pilot control;
a sensor configured to determine condition data of the aircraft;
a propulsor gauge configured to:
determine a thrust envelope parameter for the flight component, wherein the thrust envelope parameter is associated with a transition between a hover flight state and a fixed-wing flight state of the aircraft; and
determine the position of the pilot control; and
a display configured to:
display a visual representation of the thrust envelope parameter; and
update the visual representation of the thrust envelope parameter based at least in part on at least one of the position of the pilot control.

12. The aircraft of claim 11, wherein the condition data represents one or more of:
a rotational speed,
revolutions per minute,
a thrust,
a torque,
power consumption,
an angle,
a tilt,
a current, or
a voltage.

13. The aircraft of claim 11, wherein the thrust envelope parameter is based at least in part on the position of the pilot control.

14. The aircraft of claim 11, wherein the thrust envelope parameter is based at least in part on one or more of:
an angle of attack,
a climb rate,
an angular velocity, or
an aircraft limitation.

15. The aircraft of claim 11, wherein the propulsor gauge is configured to determine the thrust envelope parameter based at least in part on sensor data.

16. The aircraft of claim 11, wherein the propulsor gauge is further configured to determine a thrust envelope parameter range based at least in part on the condition data.

17. The aircraft of claim 16, wherein the visual representation comprises a band representing the thrust envelope parameter range.

18. The aircraft of claim 16, wherein the propulsor gauge is further configured to:
identify an updated thrust envelope parameter; and determine an updated thrust envelope parameter range based at least in part on the updated thrust envelope parameter.

19. The aircraft of claim 11, wherein the visual representation comprises one or more gradations, wherein the one or more gradations comprise a first gradation representing an optimal zone and a second gradation representing a buffer zone.

20. The aircraft of claim 11, further comprising an audio component configured to generate an audible alert based at least in part on detecting a pilot input outside of the thrust envelope parameter.

* * * * *